United States Patent [19]

Baumann et al.

[11] 4,025,219

[45] May 24, 1977

[54] PIPE MACHINING APPARATUS, PARTICULARLY COMBINATION PIPE THREADING AND CUTTING MACHINE

[75] Inventors: Gerhard Baumann, Schaffhausen, Switzerland; Xaver Wuchner, Jestetten, Germany

[73] Assignee: George Fisher Aktiengesellschaft, Schaffhausen, Switzerland

[22] Filed: July 16, 1975

[21] Appl. No.: 596,446

[30] Foreign Application Priority Data

July 22, 1974 Switzerland ............... 10049/74

[52] U.S. Cl. .................................. 408/29; 10/87; 408/14; 408/105
[51] Int. Cl.[2] .............................................. B23G 1/24
[58] Field of Search .............. 408/28, 26, 29, 22, 408/14, 105, 106, 124; 10/87

[56] References Cited

UNITED STATES PATENTS

| 584,026 | 6/1897 | Wells | 408/28 |
| 1,084,118 | 1/1914 | Vosper | 408/28 |
| 2,768,550 | 10/1956 | Ingwer et al. | 10/87 X |
| 3,441,965 | 5/1969 | Cutrone | 408/14 |

*Primary Examiner*—Othell M. Simpson
*Assistant Examiner*—Z. R. Bilinsky
*Attorney, Agent, or Firm*—Flynn & Frishauf

[57] ABSTRACT

To simplify the apparatus and reduce handling, a pipe threading section and a pipe cutting section are axially aligned with respect to a pipe clamping apparatus, both located at the same side of the pipe clamping section. A guide is provided, extending parallel to the axis of the pipe, to guide the clamping section on the apparatus for movement in selected positions, the moving distance of the clamping section being greater than the distance between that side of the threading tool of the pipe threading section and the cutting tool of the cutting tool section which faces the clamping section.

8 Claims, 5 Drawing Figures

PIPE MACHINING APPARATUS, PARTICULARLY COMBINATION PIPE THREADING AND CUTTING MACHINE

The present invention relates to a machine tool, and more particularly to pipe machining apparatus, especially a pipe threading and cutting machine in which a clamping section is provided to hold a pipe securely clamped and immovable with respect to rotation therein, when the pipe is being threaded and severed.

Pipe threading and cutting machines have previously been proposed in which a pipe clamp is located coaxially with respect to a pipe threader to thread the ends of pipes. The pipe threader is located in a pipe threading head or section which is movable with respect to the pipe to be worked on. The pipe threading section has dies which are specific to particular pipe sizes and thread, and which are exchangeable in a die holder. The die holder is operatively connected to a gear drive rotated by a motor. A pipe cutter is located on the housing of the machine. The pipe cutter is motor-driven and located on the machine parallel to the axis of the pipe, but pivotable with respect thereto. By means of a lever the pipe cutter can be moved radially with respect to the pipe to bring it into operative position.

It is comparatively difficult to use such an apparatus, since the pipe has to be loosened from its clamp, and re-clamped if a change in operation from the threader to the pipe cutter is desired; additionally, the pipe may have to be inverted end-for-end, which is complicated and time-consuming if long pieces of pipe are involved. If large-diameter pipe is to be cut, the dies or the die holders must be removed from the threading section which is additionally time-consuming and laborious.

It is an object of the present invention to provide a pipe working machine tool, particularly a pipe threader and cutter commbination in which pipes of greatly differing diameter can be handled and worked on, can be threaded, and cut to size. Additionally, the type of machining should be easily selectable, that is, whether to thread pipes, to cut pipes, or to cut pipes and thread the ends. The apparatus should be simple and those elements of the machine tool which are not in operation at any one time should be removed from the path of the work piece, so as not to interfere with proper operation of the one section which is in use.

SUBJECT MATTER OF THE PRESENT INVENTION

Briefly, a pipe threading section and a pipe cutting section are located, with respect to the axis of the pipe, at the same side of a clamping section. A guide means is provided, extending parallel to the axis of the pipe and guiding a pipe clamp for longitudinal movement, preferably in selectively clamped positions, and over a distance which is greater than the distance between the side of the threading tool in the threading section which faces the clamping section and the side of the cutting tool in the cutting section which faces the clamping section.

The invention will be described by way of example with reference to the accompanying drawings, wherein.

Figure 1:
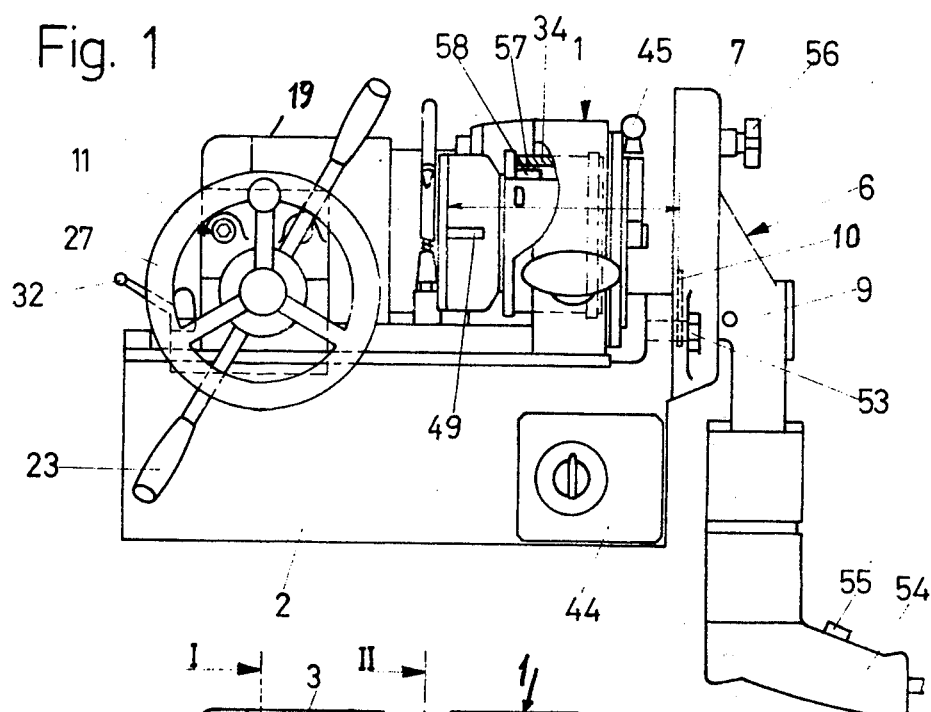
FIG. 1 is a side view of a combined pipe threading and cutting machine.

The machine essentially has a clamping section 11, a pipe cutting section 6, and a threading section 1 which is located between the clamping section 11 and the pipe cutting section 6.

The pipe clamping section 11 (see particularly FIG. 3) has a vise housing 19 in which jaws 21, 21', each supplied with pipe clamping jaw sections 20, 20, are slidably located. A threaded spindle 22 connects the sliding jaws 21, 21'; by rotating a crank 23 connected to spindle 22, a pipe 12 forming the work piece can be clamped between the jaws 21, 21' and securely held therein while being restrained against rotation. The longitudinal axis 12' (FIG. 2) of the pipe 12 will be coaxial to the machine housing 2. The arrangement of convergingly and divergingly movable jaws, moved by a rotatable spindle, is well known.

The clamping section housing 19 is longitudinally movable in the machine. It is movable in the machine housing 2 on a cylindrical guide 30 (FIG. 3) and on a flat guide plate 31. The cylindrical guide 30, preferably, is a circular rod extending parallel to the axis 12'. The clamping section housing 19 thus can be moved longitudinally in a direction parallel to the axis 12' of the pipe to be worked on. The distance of movement D (FIG. 1) over which the clamping section can be moved is greater than the distance between the sides facing the clamping section of the tools 10, 49, respectively, in the thread cutting unit 1 and in the pipe cutting unit 6. A locking clamp 32 (FIG. 1) is provided, located on the clamping housing 19 to lock the clamping housing, and hence the jaws 21, 21' in selected positions to the housing, and hence to the base, or frame, of the machine.

A gear wheel 26 (FIG. 2, FIG. 3) located laterally of the clamping section housing 19 on a shaft 25 engages a rack 33. Rack 33 is located at the side of the machine housing 2. Shaft 22 holding gear 26 is connected to a hand wheel 27 which, upon rotation, longitudinally moves the clamping section over its displacement path having the distance D.

Crank 23, to operate the spindle 22 of the clamping jaws 21, 21', is provided with an engagement clutch, so that the handle 23 can be engaged and disengaged with respect to the spindle 22, so that the best position can be selected which suits the convenience of the operator, when clamping a particular pipe 12 between the jaws 21, 21'. Spindle 22 is hollow, that is, has a longitudinal bore 24 in which the shaft 25 is journalled. The gear 26 is located at one end of the shaft, the other end of the shaft having the hand wheel 27 connected thereto. Hand wheel 27 is so arranged that there is sufficient room between its hub 28 and the guide 29 of the spindle 22 to permit clutching of the handle 23. The handle 23 is thereby secured in position on the assembly, without danger of being inadvertently removed.

Figure 2:
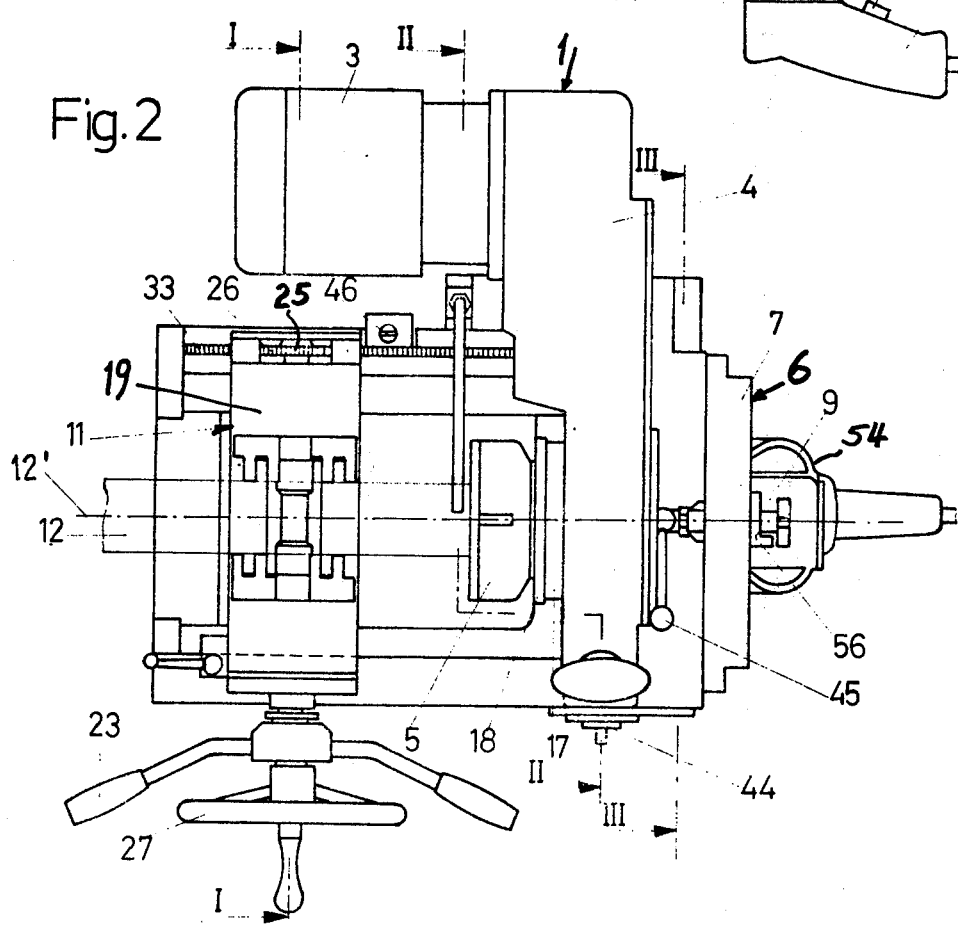
FIG. 2 is a top view of the machine of FIG. 1.
Figure 3:
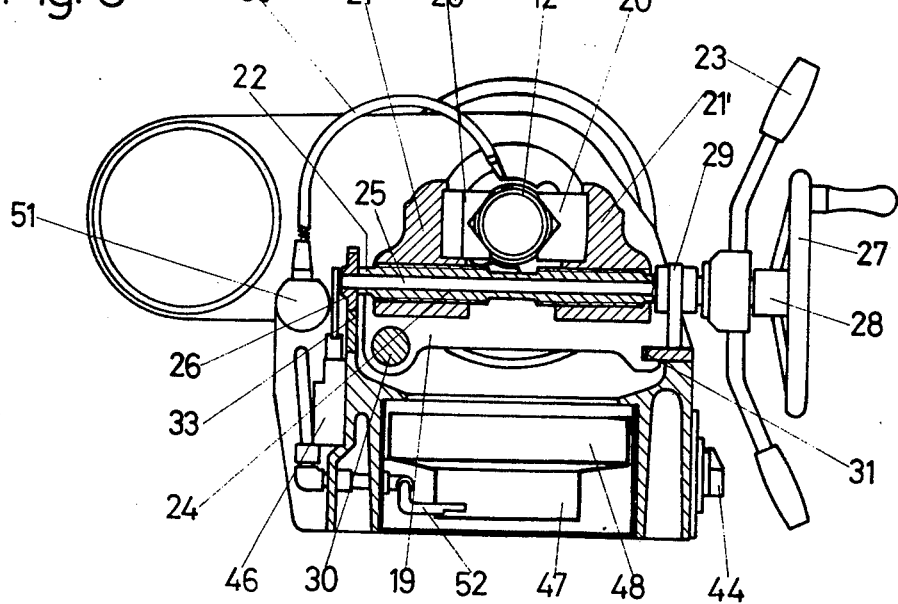
FIG. 3 is a section along line I—I of FIG. 2.
Figure 4:
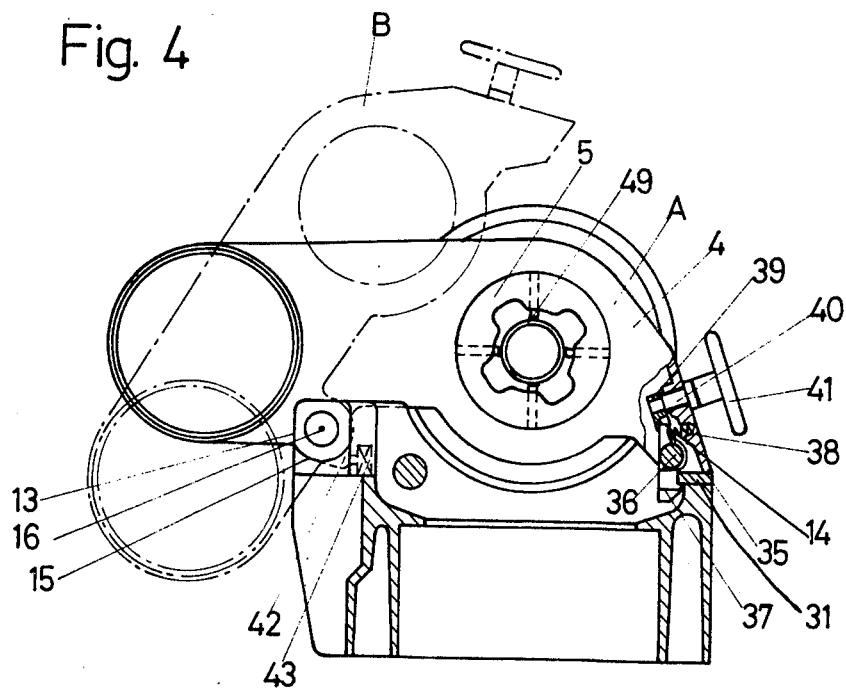
FIG. 4 is a section along line II—II of FIG. 2.

The thread cutting section 1 has a gear housing 4 (FIG. 2) in which a reduction gear transmission is located. At the drive side, a motor 3 is removably located; at the power output side, a holder 17 for a replaceably, removably inserted thread cutting head 5 is geared to the gearing within housing 4 (FIGS. 2, 4). Thread cutting tools or thread cutters 5 are provided, associated with specific thread sizes or pipe sizes, or thread types, or threads of various pitch. These thread cutters automatically open after a certain length of thread has been cut. Such thread cutters, by and themselves, are known. An initial thread closing mechanism, operated by a lever 45 (FIG. 2), is connected to the housing 4.

The reduction gearing can be arranged so that it provides output speeds in various ranges; the motor may also be a gear-type motor with reduction gearing therein of interchangeable, or selectively engageable transmission gearing. The motor is preferably operable at variable speed, and of selective direction of rotation. A main switch 44 (FIGS. 1, 2, 3) is located on machine housing 2. The main switch can be arranged to be, selectively, capable of controlling the direction of rotation of the motor, to change the motor poling, or permit other motor control functions.

The die head 5 is received in a holder 17 (FIG. 2). Holder 17 is formed as a sleeve 34 (FIG. 1) which has a bore to receive the die head 5. The bore is formed with a plurality of axial grooves 57 in which wedge-shaped cams 58 are located, which form part of, or are secured to the die head 5. This holds the die head 5 securely in position, while being restrained against rotation. A quick-release coupling 18 (FIG. 2) is provided facing the clamping section 11, and extending over the wall of the drive housing 4. The rapid-release connection, which is formed as a bayonet fastener, includes the sleeve-like holder 34, thus providing the axial attachment for the cutting head 5 itself. Other thread cutter units may be used which have a thread cutting head in which interchangeable thread cutting jaws or elements can be located.

Preferably, the arrangement is so made that the thread cutting head 5 can be replaced in its receiver or holder 17 by other cutting elements, such as chamfering tools, or other tools arranged and shaped to work at the outside, end face, or immediate end portion of the pipe work piece 12.

The pipe cutting section 1 is axially guided by a connection to the frame or housing 2 of the machine. The frame 2 of the machine has a bearing collar 15 (FIG. 4) located adjacent the side thereof. A pivot bearing 13 is located in collar 15 and connected thereto by means of a pivot pin 16. The pivot bearing 13 is connected to the housing 4 of the thread cutting section 1, to thereby axially locate the thread cutting section 1 while permitting pivoting thereof from the full-line position A of FIG. 4 to the chain-dotted position B; the full-line position is the working position, and the pivoted position B permits easy access to the pipe threading or other tools therein.

The working position A is fixed, and determined. In this position, the thread cutting 5 is coaxial to the pipe 12. To accurately locate the thread cutters with respect to the axis 12', a bearing surface 35 (FIG. 4) is provided on the housing 4 of the drive gear for the thread cutting tool, bearing surface 35 engaging a matching bearing surface formed on the frame 2. A catch 14 (FIG. 4), including a bolt 36 and a latch 37, which is spring-biased, holds the thread cutting section in position. The latch 37 is movably mounted on the housing 4. One arm thereof engages an inclined surface formed on the horizontal guide surface 31 of the frame 2, against which also the guide surface 35 can bear. The other arm is retained thereunder by a spring 38, carried in a bore of the housing 4. The spring 38 tends to hold the latch 37 in the latched position shown in FIG. 4. To unlatch or remove the housing 4, and hence the thread cutting section from working position, a camming element 39 having an inclined or spiral surface thereon, is provided, located on a shaft 40 which is positioned in housing 4. A handle 41 is secured to the other end of shaft 40, to rotate the cam 39 which, by engagement of its camming or spiral surface on the latch 37, lifts latch 37 away from under the guide surface 31.

The thread cutter unit 1 is stable both in the position A (FIG. 4) as well as in position B. When in position B, a cam surface 42 at the end of the bearing collar 13 engages frame 2 of the machine. At that location, an interlock switch 43 is located, interlocked with the main switch 44 of the machine to disable current supply to motor 3, and thus to prevent spurious operation of the thread cutting elements. Various other locations for an interlock switch and other safety switches suggest themselves; for example, switch 43 can be located to be operated by the latch 37, so that it disconnects electrical current as soon as the latch 37 is disengaged, thus not securely holding the thread cutting unit 1 in position. The various sections or elements of the machine can be electrically interlocked with the main switch 44. An end or limit switch 46 (FIG. 2) is electrically connected to the main switch 44 to disconnect power to the thread cutting head 5 as soon as the clamping section 11 is moved over a predetermined excessive distance towards the thread cutting head 5. Thus, the thread cutting section 1 can be disabled by excessive travel of the clamping section 11. The same limit switch can also be used to prevent contact with the thread cutting head 5 when it operates, and thus provides a safety feature inhibiting access to the thread cutting tools when operating, while additionally preventing possible spurious engagement of the clamping section 11 with the rotating thread cutting head 5. Mechanical interlocks may also be used rather than an electrical switch 46, or a series of electrical switches, and connected to the thread cutting unit 1 and to prevent, mechanically, contact between the thread cutting unit 1 when operating with any other portion of the machine, or with possible contact by the operator. Interlock switches, by themselves, are known, and series connected circuits, in series with the main switch, or with a relay for the main switch, can be used.

The thread cutting head 5 is preferably cooled; a cooling fluid supply nozzle 50 (FIG. 3) supplies cooling fluid from a cooling fluid supply located laterally of the machine, so that thread cutting elements 49 (FIG. 4) are cooled when cutting threads on pipe. The cooling fluid nozzle 50 (FIG. 3) is supplied by a pump 51 which is connected to a suction pipe 52, connected to a cooling supply sump 47. The cooling supply sump 47, which may also be a tank, is located in the lower part or bed of the machine 2 beneath the thread cutting section, when in the position of A of FIG. 4. A chip collecting pan 48, formed with apertures or having a mesh or sieve bottom, is located above the sump tank 47.

Figure 5:
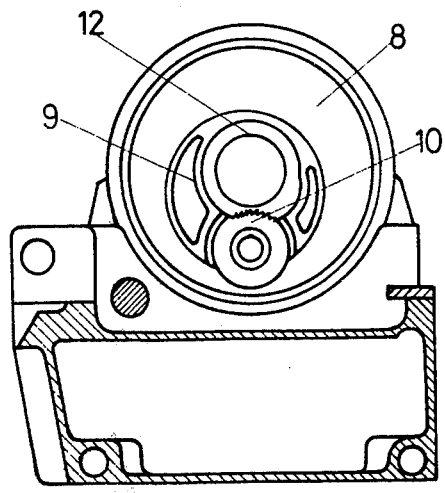
FIG. 5 is a section along line III—III of FIG. 2.

The pipe cutting section 6 is located beyond the thread cutting section 5, and in line therewith. The pipe cutting section 5 is movably connected to the frame 2 by means of screws 53. The essential components of the pipe cutter 6 are a housing 7 and a guide element 8 (FIG. 5) located therein, in which a cutter body 9 is rotatably and eccentrically located. The cutter body 9 carries a disk-shaped cutter 10, such as a circular saw blade, driven by a motor 54 (FIG. 1). Motor 54 is separately controlled by a switch 55 located in a portion of the motor housing which may be formed as a separate handle.

Housing 7 of the pipe cutter section 6 includes the guide body 8 which essentially is ring-shaped and which is removably connected to laterally arranged ring disks (not shown) parallel thereto which axially guide the body 8 within the housing 7 on the one hand, and the separating element 9 on the other. An adjustment device 56 (FIG. 1) is located in guide body 8, connected to a laterally arranged ring disk (not shown) to match the diameter of tubes to be severed. The adjustment arrangement 56 can be engaged with the element 9 by rotating the arrangement 56, by hand, about the pipe. At the initiation of this rotary movement, the separating element 9, and with it the saw blade 10, are radially adjusted with respect to the outer diameter of the work piece 12, in dependence on the eccentricity of the bore holding element 9 with respect to the circumference of the guide body 8. The remainder of the rotary movement is concentric with respect to the axis of the work piece pipe 12 to be cut, thus retaining the cutter 10 in engagement with the work piece during cutting of the pipe. By counter-rotation of the element 9, the cutter is again brought into its rest position.

Various other cutting arrangements may be used; for example, the pipe can be held centered by clamps movable in spiral tracks, the cutter being guided on a spiral track while being additionally movable circumferentially with respect to the axis of pipe 12. The machine may be mounted directly on a work bench, or on a machine frame.

The apparatus in accordance with the present invention permits separating of pipes with a minimum of non-productive time, and without leaving burrs, while permitting, economically and reliably, to thread the cut pipes. The various units permit manufacture on mass production basis and interchange of parts, and do not require skilled labor to turn out first-class work.

Various changes and modifications may be made within the scope of the inventive concept.

We claim:

1. In combination a pipe threading and cutting machine with independent threading and cutting capability, comprising
    a frame (2);
    a pipe clamping section (11) to hold a pipe (12) in the machine along an axis (12') while being restrained against rotation;
    a motor-driven pipe threading section (1) having a threading tool means (5, 49) therein;
    a pipe cutting section (6) having a pipe cutting tool means (10) therein, the pipe threading section (1) and the pipe cutting section (6) being located — with respect to the axis (12') — the same side of the pipe clamping section (11) and spaced from each other by a predetermined distance along the axis (12')
    guide means (30, 31) extending parallel to said axis (12') to guide the clamping section (11),
    means for moving the clamping section over a distance which is greater than the distance (D) between the side of the threading tool means (5, 49) of the threading section (1) which faces the clamping section (11) and the side of the cutting tool means (10) of the cutting section (6) which faces the clamping section (11);
    the pipe threading section (1) and the pipe cutting section (6) are separate, independently driven units;
    means for pivotably and removably securing said pipe threading section (1) to the frame to pivot in a plane transverse to the axis (12') and includes an individual threader drive motor (3), means for removably securing the pipe cutting section (6) to the frame (2) of the machine and includes an individual cutter drive motor (54);
    and means (32) are provided to secure the clamping section (11) to the frame (2) of the machine and fix the position of the clamping section on the guide means (30, 31) with respect to the frame (2).

2. Machine according to claim 1, wherein the threading tool means (5, 49) of the threading section (1) are removable, interchangeable threading die elements.

3. Machine according to claim 1, comprising locking means (14) to lock the pipe threading section (1) in fixed position to the machine.

4. Machine according to claim 1, wherein the threading section (1) is movable between an operated position (A) and a release position (B);
    and an interlock switch (43) is provided connected to the threader drive motor (3) inhibiting drive of the threading section if said section is not in the operated position (A).

5. Machine according to claim 1, further comprising limit safety means (46) interlocked with said threading section (1) and inhibiting operation of said threading section upon excessive movement of said pipe clamping section on said guide means in a position to interfere with operation of said threading section.

6. Machine according to claim 1, wherein said means for moving comprises rack-and-pinion means (33, 26) connecting the clamping section (11) and the frame (2) of the machine, the rack extending parallel to said guide means (30, 31);
    and manually operable means (27) connected to said rack-and-pinion means to move the clamping section over said distance on said guide means.

7. Machine according to claim 1, wherein the threading tool means (5, 49) are removable from said threading section (1), said threading section being formed to accept pipe working tools other than threading dies.

8. Machine according to claim 1, wherein the threader drive motor (3) is a reversible motor to provide rotation to said threading tools effecting, selectively, either right-hand thread cutting or left-hand thread cutting.

* * * * *